(12) United States Patent
Hoard et al.

(10) Patent No.: US 9,932,921 B2
(45) Date of Patent: Apr. 3, 2018

(54) METHOD FOR UTILIZING CONDENSATE TO IMPROVE ENGINE EFFICIENCY

(71) Applicants: Ford Global Technologies, LLC, Dearborn, MI (US); THE REGENTS OF THE UNIVERSITY OF MICHIGAN, Ann Arbor, MI (US)

(72) Inventors: John Hoard, South Lyon, MI (US); Amin Reihani, Ann Arbor, MI (US); Maneet Raj Singh, Columbus, IN (US); Daniel Joseph Styles, Canton, MI (US)

(73) Assignees: Ford Global Technologies, LLC, Dearborn, MI (US); The Regents of the University of Michigan, Ann Arbor, MI (US)

(*) Notice: Subject to any disclaimer, the term of this patent is extended or adjusted under 35 U.S.C. 154(b) by 115 days.

(21) Appl. No.: 14/922,998

(22) Filed: Oct. 26, 2015

(65) Prior Publication Data
US 2017/0114738 A1    Apr. 27, 2017

(51) Int. Cl.
*F02M 25/025*    (2006.01)
*F02B 29/04*    (2006.01)
(Continued)

(52) U.S. Cl.
CPC ...... *F02D 41/0077* (2013.01); *F02B 29/0468* (2013.01); *F02B 29/0475* (2013.01); *F02D 41/0007* (2013.01); *F02D 41/0025* (2013.01); *F02D 41/0055* (2013.01); *F02M 25/028* (2013.01); *F02M 25/0222* (2013.01);
(Continued)

(58) Field of Classification Search
CPC ............... F02B 29/04; F02B 29/0468; F02M 35/10393; F02D 41/005; F02D 41/0065; F02D 29/0475; F02D 2250/36
See application file for complete search history.

(56) References Cited

U.S. PATENT DOCUMENTS 6,301,887 B1 * 10/2001 Gorel ............... F01N 3/0222
123/563
7,934,486 B1    5/2011 Styles et al.
(Continued)

FOREIGN PATENT DOCUMENTS

| EP | 2803836 A1 | 11/2014 |
|---|---|---|
| WO | 2009045154 A1 | 4/2009 |
| WO | 2014080266 A1 | 5/2014 |

OTHER PUBLICATIONS

Styles, Daniel Joseph et al., "Method and System for Charge Air Cooler Condensate Control," U.S. Appl. No. 14/579,194, filed Dec. 22, 2014, 38 pages.

*Primary Examiner* — Thomas Moulis
(74) *Attorney, Agent, or Firm* — Julia Voutyras; McCoy Russell LLP

(57) ABSTRACT

Methods are provided for controlling a vehicle engine to improve engine efficiency utilizing onboard water condensate. In one example, condensate is collected from cooling air routed into an engine, and injected into one of a plurality of locations based on engine operating conditions to keep NOx in combustion gases below desired amounts and to avoid ignition knock in said engine. In this way, condensate build-up in the CAC is advantageously utilized, engine performance and efficiency may be improved, and harmful emissions may be reduced.

20 Claims, 6 Drawing Sheets

(51) Int. Cl.
  *F02D 41/00*      (2006.01)
  *F02M 26/07*      (2016.01)
  *F02M 26/24*      (2016.01)
  *F02M 26/32*      (2016.01)
  *F02M 25/022*     (2006.01)
  *F02M 25/028*     (2006.01)

(52) U.S. Cl.
  CPC ............ *F02M 26/07* (2016.02); *F02M 26/24* (2016.02); *F02M 26/32* (2016.02); *Y02T 10/144* (2013.01); *Y02T 10/146* (2013.01); *Y02T 10/47* (2013.01)

(56) References Cited

U.S. PATENT DOCUMENTS

| | | | |
|---|---|---|---|
| 7,980,076 B2 | 7/2011 | Buia et al. | |
| 8,042,527 B2 | 10/2011 | Styles et al. | |
| 8,061,135 B2 | 11/2011 | Rutherford | |
| 8,127,745 B2 | 3/2012 | Surnilla et al. | |
| 8,307,643 B2 | 11/2012 | Quinn et al. | |
| 8,352,162 B2 | 1/2013 | Leone et al. | |
| 8,701,630 B2 | 4/2014 | Surnilla et al. | |
| 9,140,178 B2 | 9/2015 | Pursifull | |
| 9,181,853 B2 | 11/2015 | Leone et al. | |
| 9,267,424 B2 * | 2/2016 | Wicks | F02B 29/0468 |
| 9,334,790 B2 * | 5/2016 | Marceno | F28F 17/005 |
| 9,382,836 B2 * | 7/2016 | Maceroni | F02B 33/44 |
| 9,422,855 B2 * | 8/2016 | Basile | F02B 29/0468 |
| 9,476,345 B2 * | 10/2016 | Styles | F01P 7/04 |
| 9,644,575 B2 * | 5/2017 | Ruhland | F02M 26/29 |
| 2001/0045090 A1 * | 11/2001 | Gray, Jr. | B01D 53/9495 60/278 |
| 2002/0139127 A1 * | 10/2002 | Kesten | B01D 53/268 62/93 |
| 2007/0251249 A1 * | 11/2007 | Burk | F02B 29/0462 62/121 |
| 2010/0115960 A1 * | 5/2010 | Brautsch | F02C 3/30 60/772 |
| 2010/0229549 A1 | 9/2010 | Taylor | |
| 2010/0242929 A1 * | 9/2010 | Kardos | F02B 29/0431 123/568.12 |
| 2011/0094219 A1 | 4/2011 | Palm | |
| 2011/0100341 A1 * | 5/2011 | Yacoub | F02D 41/0025 123/568.11 |
| 2011/0259306 A1 * | 10/2011 | Winsor | F02B 29/0412 123/568.12 |
| 2013/0067913 A1 * | 3/2013 | Nishio | F02M 33/04 60/599 |
| 2013/0118165 A1 | 5/2013 | Leone et al. | |
| 2013/0218438 A1 | 8/2013 | Surnilla et al. | |
| 2013/0291536 A1 * | 11/2013 | Koch | F02B 29/0468 60/599 |
| 2014/0041381 A1 | 2/2014 | Kuske et al. | |
| 2014/0102428 A1 * | 4/2014 | Fulton | F02B 29/0468 123/568.12 |
| 2014/0109568 A1 | 4/2014 | Glugla et al. | |
| 2014/0157772 A1 | 6/2014 | Glugla et al. | |
| 2014/0190148 A1 * | 7/2014 | Ruhland | F02M 25/0735 60/274 |
| 2015/0057911 A1 | 2/2015 | Wooldridge et al. | |
| 2016/0061100 A1 * | 3/2016 | Radmard | F02B 29/0468 60/599 |
| 2016/0169165 A1 * | 6/2016 | Isogai | F02B 29/04 60/605.2 |
| 2016/0326992 A1 * | 11/2016 | Keating | F02M 26/22 |

* cited by examiner

METHOD FOR UTILIZING CONDENSATE TO IMPROVE ENGINE EFFICIENCY

FIELD

The present description relates generally to methods for controlling a vehicle engine to improve engine efficiency by strategically utilizing onboard water condensate collected from a charge air cooler.

BACKGROUND/SUMMARY

Downsizing and boosting is a way to meet increased demand for more efficient vehicles. Turbocharged and supercharged engines may be configured to compress ambient air entering the engine in order to increase power. Compression of the air may cause an increase in air temperature, thus, a charge air cooler (CAC) may be utilized to cool the heated air thereby increasing its density and further increasing the potential power of the engine. Condensate may form in the CAC when the ambient air temperature decreases, or during humid or rainy weather conditions, where the intake air is cooled below the water dew point. The addition of a low pressure (LP) EGR loop additionally increases the water vapor content in the CAC and thus makes condensation more likely. Due to CAC geometry and lower air velocities, a substantial amount of water is not carried with the air and is retained in the CAC. Condensate may collect at the bottom of the CAC, or in the internal passages, and cooling turbulators. Water retained in the CAC may cause problems such as freezing damage and a reduction in CAC effectiveness. Additionally, under certain air flow conditions, condensate may exit the CAC and enter an intake manifold of the engine as water droplets. If too much condensate is ingested by the engine, engine misfire and/or combustion instability may occur.

One approach to address condensate formation in the CAC is shown by Palm in U.S. Patent No. 20110094219 A1. Therein, condensate discharged from the cooler is collected in a condensation trap coupled to an outside surface of a bend in an outlet duct of the cooler such that condensate may be stored and later released to the intake manifold. However, the inventors herein have recognized potential issues with such a system. As one example, while stored condensate may be released at such a rate that the amount of water leaving the condensation trap does not interfere with engine operation, precise control over the amount of water released to the engine under specific engine operating conditions is not achieved.

Thus, the inventors herein have developed methods to at least partially address the above issues. In one example, a method is provided comprising collecting condensate from cooling air routed into an engine, routing said condensate into the engine via one of a plurality of locations based on operating conditions of said engine, determining a desired percentage of dilution for combustion in said engine based on said operating conditions, and adjusting said condensate injection and adjusting recirculation of exhaust gases from said engine to form said desired dilution based in part on said injection location. In this way, condensation collected from the CAC may comprise a renewable onboard water source that may be advantageously utilized to meet engine dilution requirements, and in addition, reduced CAC effectiveness and potential CAC damage as a result of condensation collection and/or freezing may be addressed by removing condensation from the CAC and storing said condensate in a reservoir.

In one example, determining a desired percentage of dilution for combustion in said engine is based on said operating conditions to keep NOx in combustion gases below desired amounts and to avoid ignition knock in said engine. In this way, engine performance and efficiency may be addressed, and harmful emissions may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
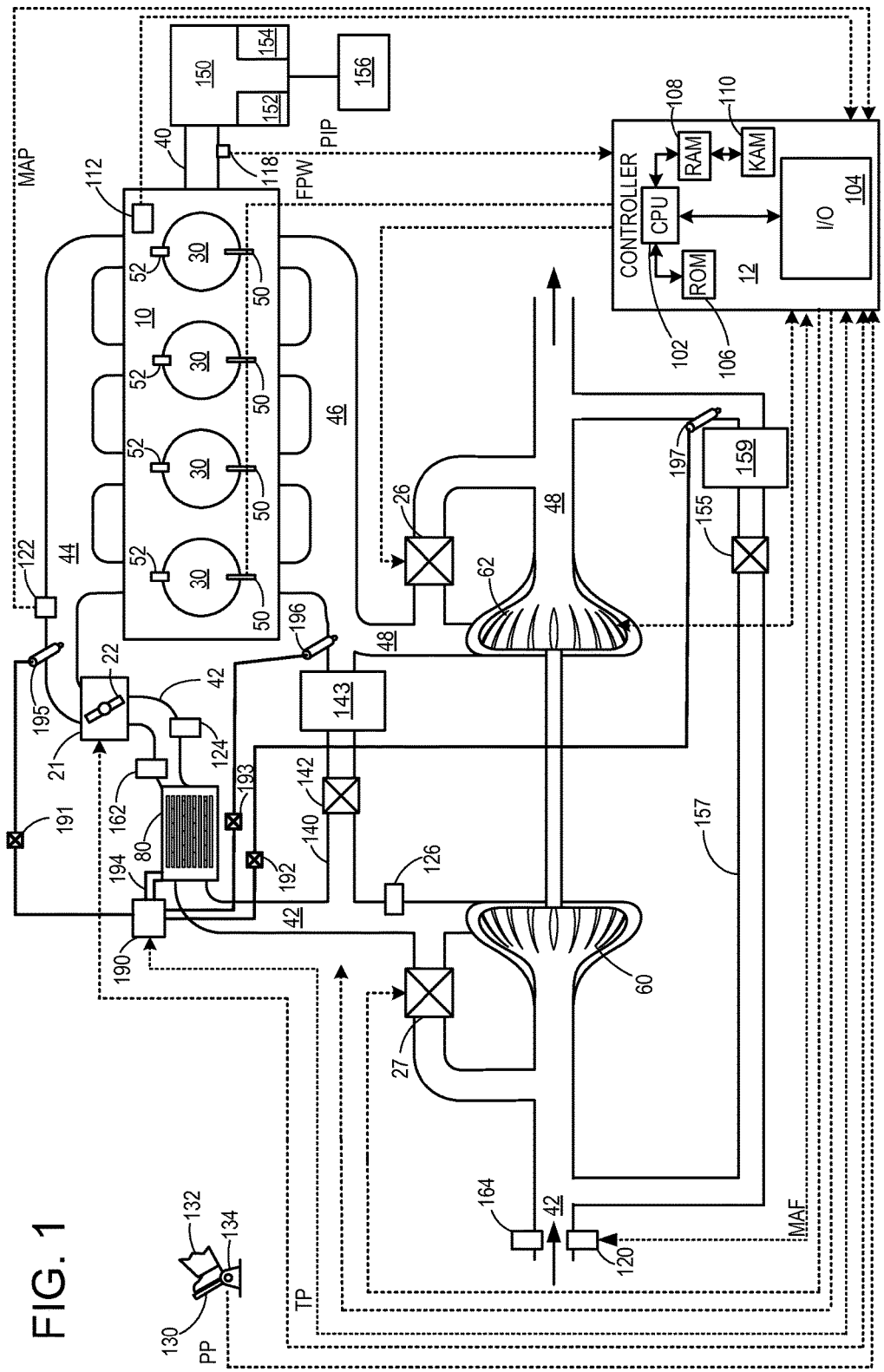
FIG. 1 is a schematic diagram of an example engine system including a charge air cooler coupled to a reservoir configured to route condensate to a plurality of engine locations.
Figure 2:
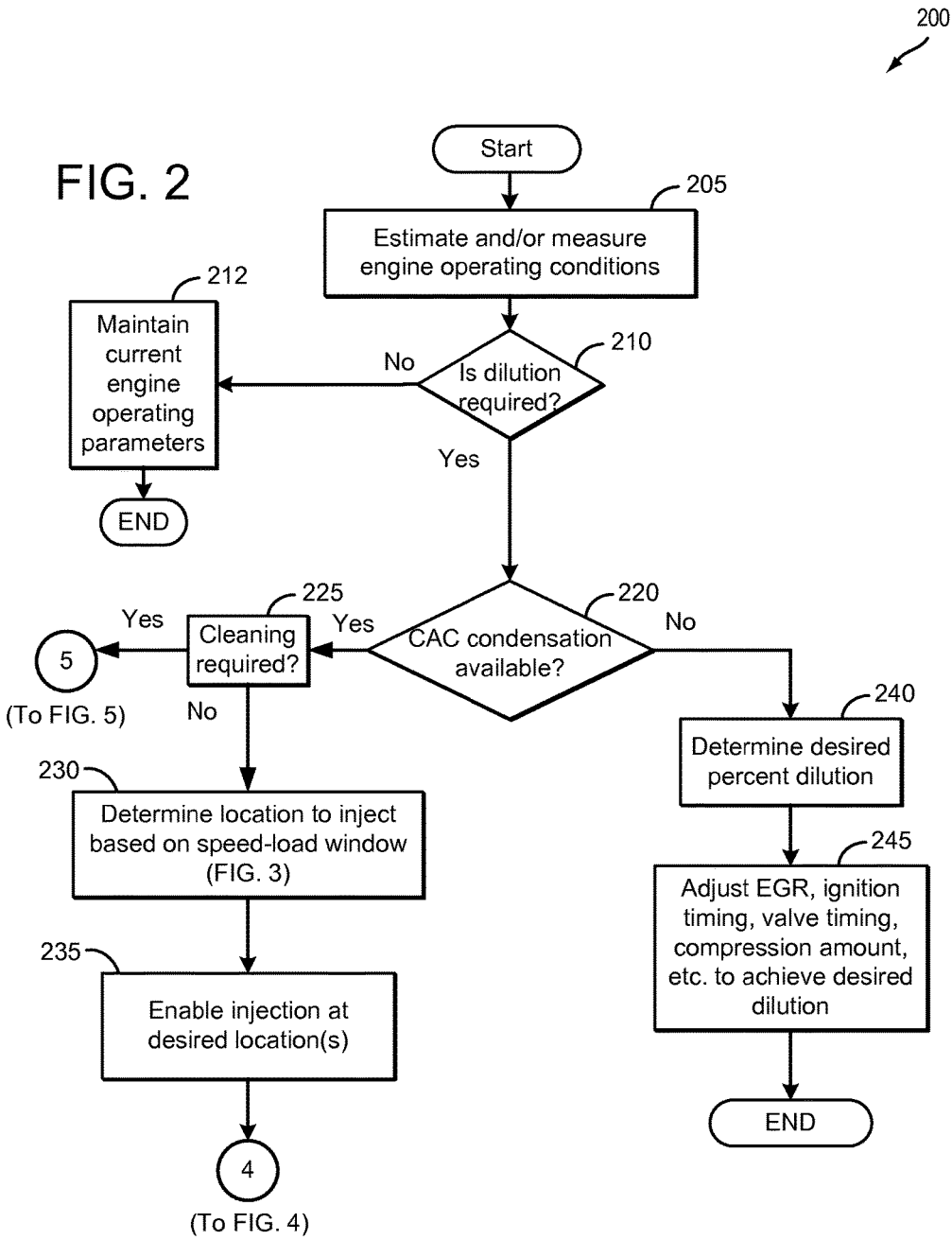
FIG. 2 is a flow chart of a method for determining where to inject condensate collected from the charge air cooler under varying engine operating conditions.

The following detailed description relates to systems and methods for utilizing condensate collected from a charge air cooler to increase engine efficiency. As air is compressed in order to increase power in modern engines, the compressed air temperature may rise and thus condense during conditions wherein the intake air is cooled below the water dew point. Freezing damage, reduced CAC effectiveness, and condensate ingestion into the intake manifold are several problems associated with CAC condensation. To overcome these limitations, condensate from the CAC may be collected and stored in a reservoir, as shown in FIG. 1. Further, water injection into a plurality of engine locations under varying engine operating conditions, is known to be advantageous. For example, water injection into the intake manifold may reduce knock tendency, reduce the formation of NOx, and can help supplement a slow LP EGR response in transient conditions. Further, injecting water upstream of the LP EGR and HP EGR coolers is known to provide a cleaning effect, and can further cool the EGR, thus further decreasing NOx emissions. Thus, collecting condensate from a CAC, and routing the said condensate to a plurality of engine locations under varying engine operating conditions, may increase engine efficiency. Further, condensate collected from the CAC serves as a renewable onboard source of water, thus eliminating the need for a vehicle operator to maintain fluid in said reservoir. FIG. 2 depicts an example high level method for indicating where to inject condensate collected from the CAC depending on engine operating conditions. More specifically, it is determined whether an engine dilution is required, and if so, the method indicates the optimal location(s) to inject stored condensate based on the availability of said condensate. The optimal location to inject may be based on a map comprising speed-load windows, indicated in FIG. 3. Further, injection of condensate collected from the CAC into a plurality of engine locations based on engine operating conditions may additionally be accompanied by adjustments in other engine controls, for example adjustments in EGR flow, ignition timing, valve timing, compression amounts, etc., based on the dilution requirements and availability of stored condensate, as detailed in the method depicted in FIG. 4. Condensate collected from the CAC may be additionally advantageously utilized to clean the LP EGR and/or HP EGR further described in the method indicated in FIG. 5. An example timeline for injecting condensate collected from a CAC in relation to engine operating conditions and dilution requirements is depicted in FIG. 6.

FIG. 1 is a schematic diagram showing an example engine 10, which may be included in a propulsion system of an automobile. The engine 10 is shown with four cylinders or combustion chambers 30. However, other numbers of cylinders may be used in accordance with the current disclosure. Engine 10 may be controlled at least partially by a control system including a controller 12, and by input from a vehicle operator 132 via an input device 130. In this example, the input device 130 includes an accelerator pedal and a pedal position sensor 134 for generating a proportional pedal position signal PP. Each combustion chamber (e.g., cylinder) 30 of the engine 10 may include combustion chamber walls with a piston (not shown) positioned therein. The pistons may be coupled to a crankshaft 40 so that reciprocating motion of the piston is translated into rotational motion of the crankshaft. The crankshaft 40 may be coupled to at least one drive wheel of a vehicle via an intermediate transmission system 150. Further, a starter motor may be coupled to crankshaft 40 via a flywheel to enable a starting operation of engine 10. The crankshaft 40 may also be used to drive an alternator (not shown in FIG. 1).

An engine output torque may be transmitted to a torque converter (not shown) to drive the automatic transmission system 150. Further, one or more clutches may be engaged, including forward clutch 154, to propel the automobile. In one example, the torque converter may be referred to as a component of the transmission system 150. Further, transmission system 150 may include a plurality of gear clutches 152 that may be engaged as needed to activate a plurality of fixed transmission gear ratios. Specifically, by adjusting the engagement of the plurality of gear clutches 152, the transmission may be shifted between a higher gear (that is, a gear with a lower gear ratio) and a lower gear (that is, a gear with a higher gear ratio). As such, the gear ratio difference enables a lower torque multiplication across the transmission when in the higher gear while enabling a higher torque multiplication across the transmission when in the lower gear. The vehicle may have four available gears, where transmission gear four (transmission fourth gear) is the highest available gear and transmission gear one (transmission first gear) is the lowest available gear. In other embodiments, the vehicle may have more or less than four available gears. As elaborated herein, a controller may vary the transmission gear (e.g., upshift or downshift the transmission gear) to adjust an amount of torque conveyed across the transmission and torque converter to vehicle wheels 156 (that is, an engine shaft output torque).

As the engine load and the engine speed (N or RPM) increase, engine airflow increases. An intake manifold vacuum generated by the spinning engine may be increased at lower engine load and RPM. In some examples, downshifting may be used to increase engine airflow and purge condensate built up in a charge air cooler (CAC) 80.

The combustion chambers 30 may receive intake air from the intake manifold 44 and may exhaust combustion gases via an exhaust manifold 46 to an exhaust passage 48. The intake manifold 44 and the exhaust manifold 46 can selectively communicate with the combustion chamber 30 via respective intake valves and exhaust valves (not shown). In some embodiments, the combustion chamber 30 may include one or more intake valves and/or one or more exhaust valves.

Fuel injectors 50 are shown coupled directly to the combustion chamber 30 for injecting fuel directly therein in proportion to the pulse width of signal FPW received from controller 12. In this manner, the fuel injector 50 provides what is known as direct injection of fuel into the combustion chamber 30; however it will be appreciated that port injection is also possible. Fuel may be delivered to the fuel injector 50 by a fuel system (not shown) including a fuel tank, a fuel pump, and a fuel rail.

In a process referred to as ignition, the injected fuel is ignited by known ignition means such as spark plug 52, resulting in combustion. Spark ignition timing may be controlled such that the spark occurs before (advanced) or after (retarded) the manufacturer's specified time. For example, spark timing may be retarded from maximum break torque (MBT) timing to control engine knock or advanced under high humidity conditions. In particular, MBT may be advanced to account for the slow burn rate. In one example, spark may be retarded during a tip-in. In an alternate embodiment, compression ignition may be used to ignite the injected fuel.

The intake manifold 44 may receive intake air from an intake passage 42. The intake passage 42 and/or intake manifold 44 includes a throttle 21 having a throttle plate 22 to regulate flow to the intake manifold 44. In this particular example, the position (TP) of the throttle plate 22 may be varied by the controller 12 to enable electronic throttle control (ETC). In this manner, the throttle 21 may be operated to vary the intake air provided to the combustion chambers 30. For example, the controller 12 may adjust the throttle plate 22 to increase an opening of the throttle 21. Increasing the opening of the throttle 21 may increase the amount of air supplied to the intake manifold 44. In an alternate example, the opening of the throttle 21 may be decreased or closed completely to shut off airflow to the intake manifold 44. In some embodiments, additional throttles may be present in intake passage 42, such as a throttle upstream of a compressor 60 (not shown).

Further, in the disclosed embodiments, an exhaust gas recirculation (EGR) system may route a desired portion of exhaust gas from the exhaust passage 48 to the intake passage 42 via an EGR passage, such as high pressure EGR passage 140. The amount of EGR provided to the intake passage 42 may be varied by the controller 12 via an EGR valve, such as high pressure EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger through EGR passage 140. FIG. 1 also shows a low pressure EGR system where EGR is routed from downstream of turbine of a turbocharger to upstream of a compressor of a turbocharger through low pressure EGR passage 157. A low pressure EGR valve 155 may control the amount of EGR provided to the intake passage 42. In some embodiments, the engine may include both a high pressure EGR and a low pressure EGR system, as shown in FIG. 1. In other embodiments, the engine may include either a low pressure EGR system or a high pressure EGR system. When operable, the EGR system may induce the formation of condensate in the compressed air, particularly when the compressed air is cooled by the charge air cooler, as described in more detail below. For example, the low pressure EGR passage 157 may include a low pressure EGR cooler 159 and the high pressure EGR passage 140 may include a high pressure EGR cooler 143.

The engine 10 may further include a compression device such as a turbocharger or supercharger including at least a compressor 60 arranged along the intake passage 42. For a turbocharger, the compressor 60 may be at least partially driven by a turbine 62, via, for example a shaft, or other coupling arrangement. The turbine 62 may be arranged along the exhaust passage 48. Various arrangements may be provided to drive the compressor. For a supercharger, the compressor 60 may be at least partially driven by the engine and/or an electric machine, and may not include a turbine. Thus, the amount of compression provided to one or more cylinders of the engine via a turbocharger or supercharger may be varied by the controller 12.

In the embodiment shown in FIG. 1, the compressor 60 may be driven primarily by the turbine 62. The turbine 62 may be driven by exhaust gases flowing through the exhaust passage 48. Thus, the driving motion of the turbine 62 may drive the compressor 60. As such, the speed of the compressor 60 may be based on the speed of the turbine 62. As the speed of the compressor 60 increases, more boost may be provided through the intake passage 42 to the intake manifold 44.

Further, the exhaust passage 48 may include a wastegate 26 for diverting exhaust gas away from the turbine 62. Additionally, the intake passage 42 may include a compressor bypass or recirculation valve (CRV) 27 configured to divert intake air around the compressor 60. The wastegate 26 and/or the CRV 27 may be controlled by the controller 12 to be opened when a lower boost pressure is desired, for example. For example, in response to compressor surge or a potential compressor surge event, the controller 12 may open the CRV 27 to decrease pressure at the outlet of the compressor 60. This may reduce or stop compressor surge.

The intake passage 42 may further include a charge air cooler (CAC) 80 (e.g., an intercooler) to decrease the temperature of the turbocharged or supercharged intake gases. In some embodiments, the CAC 80 may be an air to air heat exchanger. In other embodiments, the CAC 80 may be an air to liquid heat exchanger. The CAC 80 may also be a variable volume CAC. Hot charge air (boosted air) from the compressor 60 enters the inlet of the CAC 80, cools as it travels through the CAC, and then exits to pass through the throttle 21 and then enter the engine intake manifold 44. Ambient air flow from outside the vehicle may enter the engine compartment through a vehicle front end and pass across the CAC, to aid in cooling the charge air. Condensate may form and accumulate in the CAC when the ambient air temperature decreases, or during humid or rainy weather conditions, where the charge air is cooled below the water dew point temperature. Further, when the charge air entering the CAC is boosted (e.g., boost pressure and/or CAC pressure is greater than atmospheric pressure), condensate may form if the CAC temperature falls below the dew point temperature. When the charge air includes recirculated exhaust gasses, the condensate can become acidic and corrode the CAC housing. Further, if condensate builds up in the CAC, it may be ingested by the engine during times of increased airflow. As a result, unstable combustion and/or engine misfire may occur.

For the reasons thus described, a reservoir 190 may be included in order to collect condensate formed in the CAC under conditions mentioned above. In one example, reservoir 190 may be connected to CAC 80 by passage 194. Reservoir 190 may include a fluid level sensor coupled to the reservoir, in one example (not shown). Reservoir 190 may further include a pump or plurality of pumps (not shown), configured to route collected condensate to a plurality of locations. For example, stored condensate may be routed from reservoir 190 to locations including one or more of intake manifold 44, upstream of HP EGR cooler 143, and upstream of LP EGR cooler 159. Routing of stored condensate may be further controlled by valves, such as valves 191, 192, 193, for example, configured to open and close in response to commands from the controller 12. Further, controller 12 may adjust the one or more valves 191, 192, 193, to be open to varying degrees, in order to precisely regulate the flow of stored condensate to the one or more engine locations. Additionally, injectors, such as injectors 195, 196, 197 may be configured to inject stored condensate into the one or more engine locations indicated above, including but not limited to the intake manifold 44, upstream of the LP EGR cooler, and upstream of the HP EGR cooler. Injectors 195, 196, and 197 may be controlled by controller 12, to precisely regulate the duration of fluid injection, for example. Advantages of water injection into the intake manifold include one or more of an increase in volumetric efficiency due to the cooling effect, nearly homogeneous water distribution in the combustion chamber, knock tendency reduction, and NOx reduction. Water injection into the intake manifold can also help supplement the slow LP EGR response in transient conditions. Additionally, water can be injected into the intake manifold in a controlled manner and when the engine can tolerate the water injection, and injection can be coordinated with spark timing, boost level, EGR rate, valve timing, etc. Water injection upstream of the LP/HP EGR coolers may provide benefits such as a cleaning effect that water has on EGR coolers. For example, water injection may remove deposits from EGR cooler surfaces, thereby improving performance of the EGR cooler. Additionally, water may also further cool down the EGR, which can increase brake thermal efficiency by reducing pump work, shifting lambda and further decrease the NOx emissions. As with water injection into the intake manifold, water injection upstream of the LP/HP EGR coolers can be performed in a controlled manner and when the engine can tolerate the water injection, coordinated with spark timing, boost level, valve timing, etc. As reservoir 190 collects and stores CAC condensate, the solution may be prone to freezing under certain conditions. To prevent freezing, the condensate container may be equipped with a heater, or mounted near the exhaust manifold in order to prevent freezing or to quickly defrost the condensate, in the case that the collected condensate is frozen inside reservoir 190.

The engine 10 may further include one or more oxygen sensors positioned in the intake passage 42 and/or the intake manifold 44. As such, the one or more oxygen sensors may be referred to as intake oxygen sensors. In the depicted embodiment, an oxygen sensor 162 is positioned downstream of the CAC 80 and upstream of the throttle 21. In another example, the oxygen sensor 162 may be positioned downstream of the CAC 80 outlet and downstream of the throttle 21. In yet other embodiments, the oxygen sensor 162 or a second oxygen sensor may be positioned at the inlet of the CAC. An oxygen sensor may also be positioned in the intake passage 42 between an outlet of the low pressure EGR passage 157 and an inlet to the compressor 60. Intake oxygen sensor 162 may be any suitable sensor for providing an indication of the oxygen concentration of the charge air (e.g., air flowing through the intake passage 42), such as a linear oxygen sensor, intake UEGO (universal or wide-range exhaust gas oxygen) sensor, two-state oxygen sensor, etc. In one example, the intake oxygen sensor 162 may be an intake oxygen sensor including a heated element as the measuring element.

As elaborated herein, the intake oxygen sensor 162 may be configured to provide an estimate regarding the oxygen content of air and EGR charge received in the intake manifold. A pressure sensor 124 may be positioned alongside the oxygen sensor 162 for estimating an intake pressure at which an output of the oxygen sensor 162 is received. Since the output of the oxygen sensor 162 is influenced by the intake pressure, a reference oxygen sensor output may be learned at a reference intake pressure. In one example, the reference intake pressure is a throttle inlet pressure (TIP) where pressure sensor 124 is a TIP sensor. In alternate examples, the reference intake pressure is a manifold pressure (MAP) as sensed by MAP sensor 122. Additionally, the intake passage 42 may include a humidity sensor 164 configured to estimate a relative humidity of the intake air. In one embodiment, the humidity sensor 164 is a UEGO sensor configured to estimate the relative humidity of the intake air based on the output of the sensor at one or more voltages. In some examples, the output of the oxygen sensor 162 may be corrected based on the output of the humidity sensor 164.

The intake oxygen sensor 162 may be used for estimating the intake oxygen concentration, total aircharge dilution, and inferring an amount of EGR flow through the engine based on a change in the intake oxygen concentration when EGR is flowing (e.g., upon opening the EGR valve 142 or 155). Specifically, a change in the output of the oxygen sensor 162 upon opening the EGR valve 142 or 155 is compared to a reference point where the sensor is operating with no EGR (the zero point). Based on the change (e.g., decrease) in oxygen amount from the time of operating with no EGR, an EGR flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR relative to sensor output in the absence of EGR (the zero point). Based on a deviation of the estimated EGR flow from the expected (or target) EGR flow, further EGR control may be performed.

For example, when EGR is flowing, the change in oxygen concentration at the oxygen sensor 162 may be used to infer the EGR amount or flow rate which may then be used for EGR flow adjustments (via the EGR valve 142 and/or 155), spark timing adjustments, intake or exhaust valve timing adjustments, amount of compression adjustments, throttle position adjustments, and/or water injection adjustments (via adjusting the one or more valves 191, 192, 193, and one or more injectors 195, 196, 197 in order to regulate the flow of stored condensate to the one or more engine locations).

For example, controller 12 may estimate the percent dilution based on feedback from the oxygen sensor 162. In some examples, the controller 12 may then adjust one or more of EGR valve 142, EGR valve 155, throttle 21, CRV 27, spark timing, intake or exhaust valve timing, amount of compression, water injection location 195, 196, 197, and/or wastegate 26 to achieve a desired EGR dilution percentage of the intake air. In another example, the controller may determine a total aircharge dilution (whether EGR is flowing or not) representing the total percent dilution of the aircharge due to diluents in the airflow (including EGR and water vapor). In some examples, the controller 12 may assume the total aircharge dilution to be EGR. In other examples, for instance if water is injected upstream of the LP/HP EGR coolers or directly into the intake manifold as described above, the total aircharge dilution may represent the sum of diluents in the airflow, including EGR and water vapor. The controller may then adjust one or more of EGR valve 142, EGR valve 155, spark timing, intake or exhaust valve timing, amount of compression, throttle 21, CRV 27, and/or wastegate 26 to achieve a desired total aircharge dilution percentage of the intake air.

During conditions when water is released from the CAC into the charge air flow, water in the form of droplets may contact the oxygen sensor 162. When water hits the sensor, the heated element of the oxygen sensor 162 may evaporate the water and measure it as a local vapor or diluent in the charge air flow. As discussed further below, this may cause the intake oxygen measured at the oxygen sensor 162 to decrease. As a result, when EGR is flowing, EGR flow based on the intake oxygen measured at the oxygen sensor 162 may be overestimated. When EGR is not flowing, the total aircharge dilution level may be overestimated. The overestimated EGR and/or total aircharge dilution may result in inaccurate throttle adjustments that may increase airflow to the engine to a higher level than required for the torque demand. To prevent water being released into the charge air flow, condensate from CAC may be collected and stored in a reservoir, such as reservoir 190. As described above, stored condensate may be thus be routed to a plurality of engine locations, for example the intake manifold 44, upstream of HP EGR cooler 143, and upstream of LP EGR cooler 159, for injection thereto under conditions wherein water injection may be advantageous and the quantity of water injected may be accurately controlled.

The controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10 for performing various functions to operate the engine 10. In addition to those signals previously discussed, these signals may include measurement of inducted mass air flow from MAF sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by the controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the Hall effect sensor 118, which is also used as an engine speed sensor, may produce a predetermined number of equally spaced pulses every revolution of the crankshaft 40.

Other sensors that may send signals to controller 12 include the pressure sensor 124 at an outlet of a charge air cooler 80, the oxygen sensor 162, the humidity sensor 164, and a boost pressure sensor 126. In one example, the pressure sensor 124 may also be a temperature sensor. Other sensors not depicted may also be present, such as a sensor for determining the intake air velocity at the inlet of the charge air cooler, and other sensors. In some examples, storage medium read-only memory chip 106 may be programmed with computer readable data representing instructions executable by microprocessor unit 102 for performing the methods described below as well as other variants that are anticipated but not specifically listed.

The system of FIG. 1 provides for an engine system including an intake manifold, a charge air cooler positioned in an intake passage upstream of the intake manifold, an intake throttle coupled to the intake manifold downstream of the charge air cooler, an exhaust gas recirculation (EGR) system including a plurality of passages for recirculating exhaust residuals from an exhaust passage to an intake passage via EGR valves, oxygen sensor(s) coupled to the intake passage, downstream of the charge air cooler and upstream of the intake throttle and/or downstream of the throttle in the intake manifold, and a compressor arranged along the intake passage and which may be at least partially driven by a turbine. The engine system further includes a reservoir connected to the CAC, configured to collect and store condensate from the CAC, which may be routed to a plurality of engine locations, for example the intake manifold, upstream of the LP EGR cooler, and upstream of the HP EGR cooler. The engine system further includes a controller with computer readable instructions for injecting stored condensate into a plurality of engine locations under varying engine operating conditions and for routing exhaust gases from said engine into an air intake via one or more of a plurality of locations under varying engine operating conditions. In one example, a desired percentage of dilution for combustion may be determined based on said engine operating conditions, to keep NOx in combustion gases below desired amounts and to avoid engine knock in said engine. Based upon said location selected for routing said condensate and said location selected for routing said exhaust gases, a determined amount of condensate may be injected and recirculation of exhaust gases adjusted such that the desired dilution is obtained. Obtaining the desired dilution may further require additional adjustments, for example adjusting ignition timing, adjusting valve timing, adjusting compression speeds, etc. Additionally, in obtaining the desired dilution the amount of condensate injected, amount of recirculation of exhaust gases, ignition timing, valve timing, compression speeds, etc., may be readjusted as the availability of said condensate varies. In one example, in response to low levels of condensate, a desired dilution may be obtained by adjusting ignition timing, adjusting valve timing, and/or adjusting compression speeds in order to meet dilution requirements such that ignition knock or undesired engine temperature is avoided.

As previously discussed, the intake air oxygen sensor 162 can be used to measure the amount of EGR in the intake aircharge (or total aircharge dilution) as a function of the amount of change in oxygen content due to the addition of EGR and/or water vapor as a diluent. During operation, a pumping current of the intake oxygen sensor 162 may be indicative of an amount of oxygen in the gas flow. Thus, as more diluent is introduced, the sensor may output a reading or pumping current corresponding to a lower oxygen concentration. During the estimation, a nominal reference voltage (e.g., at 450 mV), or Nernst voltage, is applied to the sensor and an output (e.g., a pumping current output by the sensor upon application of the lower reference voltage) is noted. Based on the output of the sensor relative to a zero point of the sensor (that is, sensor output at no diluent conditions, either EGR or water), a change in oxygen concentration is learned, and an intake dilution is inferred. In this way, output from oxygen sensor 162 may be used to indicate a percent intake dilution in response to changes in EGR flow and/or in response to the injection of condensate into a plurality of engine locations. For example, in response to engine operating conditions, injection of condensate collected from the CAC into the intake manifold may be advantageous. Accordingly, an adjustment in the total EGR flow may be indicated, such that a desired percent dilution is obtained. The output of oxygen sensor 162 may thus be utilized in order to coordinate intake manifold condensate injection concurrent with a decrease in EGR flow such that the desired percent may be obtained, and maintained for the duration that the specified dilution is optimal. In other examples, engine operating parameters may indicate dilution requirements such that condensate may be injected into one or more of a plurality of engine locations, and correspondingly, adjustments in EGR flow, ignition timing, intake and exhaust valve timing, compression speeds, etc., may be made such that desired dilution percentages are obtained. In this way, condensate injection into a plurality of engine locations may be advantageously utilized to meet engine dilution requirements and increase engine efficiency, thus eliminating problems associated with CAC condensation such as freezing, reduced CAC effectiveness, and engine misfire and/or combustion instability due to water ingestion into the intake manifold.

A flow chart for a high-level example method 200 for determining the path to inject condensate collected from a CAC is shown in FIG. 2. More specifically, method 200 includes determining whether engine dilution is required, and if so, enabling the injection of condensate collected from a CAC into one or more of the intake manifold, upstream of the LP EGR cooler, and/or upstream of the HP EGR cooler. Alternatively, if dilution is not required, method 200 includes determining whether cleaning of one or more of the LP EGR cooler or HP EGR cooler is required. Method 200 will be described with reference to the systems described herein and shown in FIG. 1, though it should be understood that similar methods may be applied to other systems without departing from the scope of this disclosure. Method 200 may be carried out by a controller, such as controller 12 in FIG. 1, and may be stored at the controller as executable instructions in non-transitory memory. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

Method 200 begins at 205 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, spark timing, boost, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. At 210, method 200 includes determining whether engine dilution is required. A dilution requirement may be indicated based on the current engine operating parameters (e.g., engine speed and load). The engine dilution demand may be determined based on a variety of factors, including but not limited to $NO_x$ formation, engine temperature, air/fuel ratio, pre-ignition events, and the presence of engine knock. In some examples, the desired dilution rate may also be determined by an optimal fuel economy for the engine. If at 210 it is determined that dilution is not required, method 200 proceeds to 212 wherein the controller maintains current engine operating parameters. Maintaining current engine operating parameters at 212 may include maintaining CAC routing valves, such as valves 191, 192, 193, and injectors, such as injectors 195, 196, 197, in their current state. As another example, at 212, method 200 may further include maintaining HP EGR valve, such as valve 142, and low pressure EGR valve, such as valve 155, in their current state. The method may then end.

If at 210 it is determined that engine dilution is required, method 200 proceeds to 220 where it is determined whether condensation collected from the CAC is available. Whether condensate is available may be based on a threshold, above which a measurable amount of condensate is present in the CAC reservoir, below which a measurable amount of condensate is not present. The presence of condensate collected from the CAC may be indicated by a fluid level sensor coupled to the reservoir, in one example. In another example, the presence of condensate may be indicated by monitoring a current draw of the pump utilized for the routing of CAC condensate to a plurality of engine locations, i.e., when the water level is empty the pump work will decrease and consequently the pump will draw lower current. If at 220 it is determined that CAC condensation is not available, method 200 proceeds to 240 where a desired dilution percentage is determined. A desired dilution percent may be indicated based on the current engine operating parameters (e.g., engine speed and load), $NO_x$ formation, engine temperature, air/fuel ratio, pre-ignition events, and the presence of engine knock. In one example, a higher percent dilution may be desired as an engine load increases to reduce the likelihood of engine knock, as well as to improve engine NOx emissions, but subject to a combustion stability limit. In some examples, the desired dilution rate may also be determined by an optimal fuel economy for the engine. Following determining the desired dilution at 240, method 200 proceeds to 245 where appropriate changes to the control system are implemented in order to meet dilution requirements. For example, a desired dilution percentage of the intake air may be meet by adjustment of one or more of EGR valves, such as 142 and/or 155 as shown in FIG. 1, adjusting spark timing, adjusting intake or exhaust valve timing, adjusting the amount of compression, etc. Method 200 may then end.

Returning to 220, if it is determined that CAC condensation is available, method 200 proceeds to 225 where it is determined whether cleaning of one or more of the LP EGR cooler or the HP EGR cooler is required. The EGR cooler cleaning demand may be determined by a measurement or model. As one example, the measurement may include determining a particulate load in the EGR cooler being greater than a threshold particulate load. Particulate matter load may be determined by measuring a change in an EGR pressure upstream and downstream of the EGR cooler. A particulate matter load above the threshold particulate load may create a flow blockage, causing the pressure change across the EGR cooler to increase. Therefore, if a pressure change across the EGR cooler is greater than a threshold EGR cooler pressure, then the EGR cooler may be fouled. As another example, particulate matter load may be determined by measuring a temperature of EGR downstream and upstream of the EGR cooler. Particulate matter load above the threshold particulate load in the EGR cooler may reduce heat transfer properties between the EGR and the EGR cooler. The particulate matter may reduce an amount of surface contact between the EGR cooler and the EGR. As a result, the temperature of EGR downstream of the EGR cooler may be higher than a threshold cooled EGR temperature.

The model to determine the EGR cleaning demand may include a scheduled periodic maintenance, such as after a pre-determined number of miles driven (e.g., 5000) or hours of usage (e.g., 100). If a controller (e.g., controller 12) determines an EGR cooler cleaning demand, then method 200 includes cleaning one or more of the LP EGR cooler and/or the HP EGR cooler, as described by the method detailed in FIG. 5. If no EGR cooler cleaning demand is detected, method 200 proceeds to 230.

Figure 3:
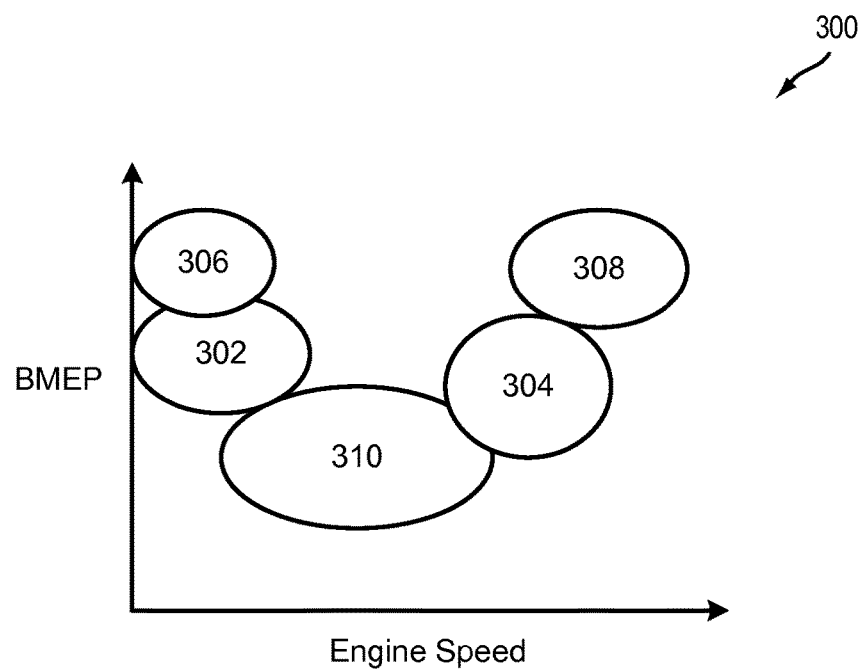
FIG. 3 shows a map that may be used to indicate the location for injection of condensate collected from the charge air cooler based on speed-load conditions.

At 230, method 200 includes determining the optimal location for condensation injection based on engine operating conditions including engine speed and load as described in detail in FIG. 3. The optimal location may include one or more of the intake manifold, upstream of an LP EGR cooler, and/or upstream of an HP EGR cooler depending on the relationship between engine speed and load. Following determination of the optimal injection location(s), method 200 proceeds to 235 wherein water injection into the desired injection locations is enabled by boosting water pressure in the pump configured to direct water to the specified locations. Method 200 may then proceed with injection at the determined locations, according to the method detailed in FIG. 4.

Now turning to FIG. 3, a map 300 is shown for determining the optimal location or locations for water injection. Specifically, map 300 identifies regions (herein displayed as regions 302, 304, 306, 308, 310), based on speed-load windows, wherein direct injection of water collected from CAC condensate may function to meet engine dilution requirements as described in relation to the method described in FIG. 2. Under different engine operating conditions, it may be beneficial to inject water into one or more of an intake manifold, upstream of an LP EGR cooler, or upstream of an HP EGR cooler.

For example, a vehicle operating in a region characterized by high load and low speed, such as region 302, may be prone to pre-ignition combustion events and knock. In this region, HP EGR flow is insufficient, and LP EGR has a slow transient response. Therefore, water injection into the intake manifold may supplement LP EGR, thereby meeting dilution requirements to address pre-ignition events and engine knock. Additionally, it may be advantageous in this region to combine intake manifold injection with injection upstream of the LP EGR cooler to further cool EGR flow, and clean the LP EGR cooler. In another example, a vehicle operating in a region characterized by high load and high speeds, such as region 304, may have elevated exhaust temperatures, and an increase in particulate matter emissions. In this region, HP EGR flow is also limited, and LP EGR similarly has a slow transient response. Therefore, in this region, once again water injection into the intake manifold may also be used to supplement HP and LP EGR, thereby meeting dilution requirements to reduce exhaust temperature and curb particulate matter emissions. Additionally, it may be advantageous in this region to combine intake manifold injection with injection upstream of the HP and LP EGR coolers, thus further cooling EGR flow, reducing NOx formation, and cleaning the HP and LP EGR coolers. Yet another example includes conditions wherein a vehicle is operating in regions characterized by very high load and high speeds, such as region 308, where LP EGR is flow limited and thus HP EGR plus water injection into the intake manifold may be advantageous, and high load and low speeds, such as region 306 where HP EGR or LP EGR are flow limited due to boost limitations and thus dilution may be achieved mainly by water injection into the intake manifold. In either of these scenarios EGR flow is limited to address dilution requirements, and thus water injection into the intake manifold may be advantageous. Further, high load and high speed regions, such as region 308 may be characterized by higher exhaust temperature and increased particulate matter beyond that observed for region 304, indicating the requirement for a greater amount of water injection to reduce EGR cooler fouling in this region.

In another example, for a vehicle operating in mid-load, mid-speed conditions, such as the region characterized by region 310, water injection upstream of one or more of the LP EGR cooler, and/or upstream of the HP EGR cooler may be beneficial for further cooling down the EGR and combustion chambers, thus increasing brake thermal efficiency by shifting lambda, and further decreasing NOx emissions.

Figure 4:
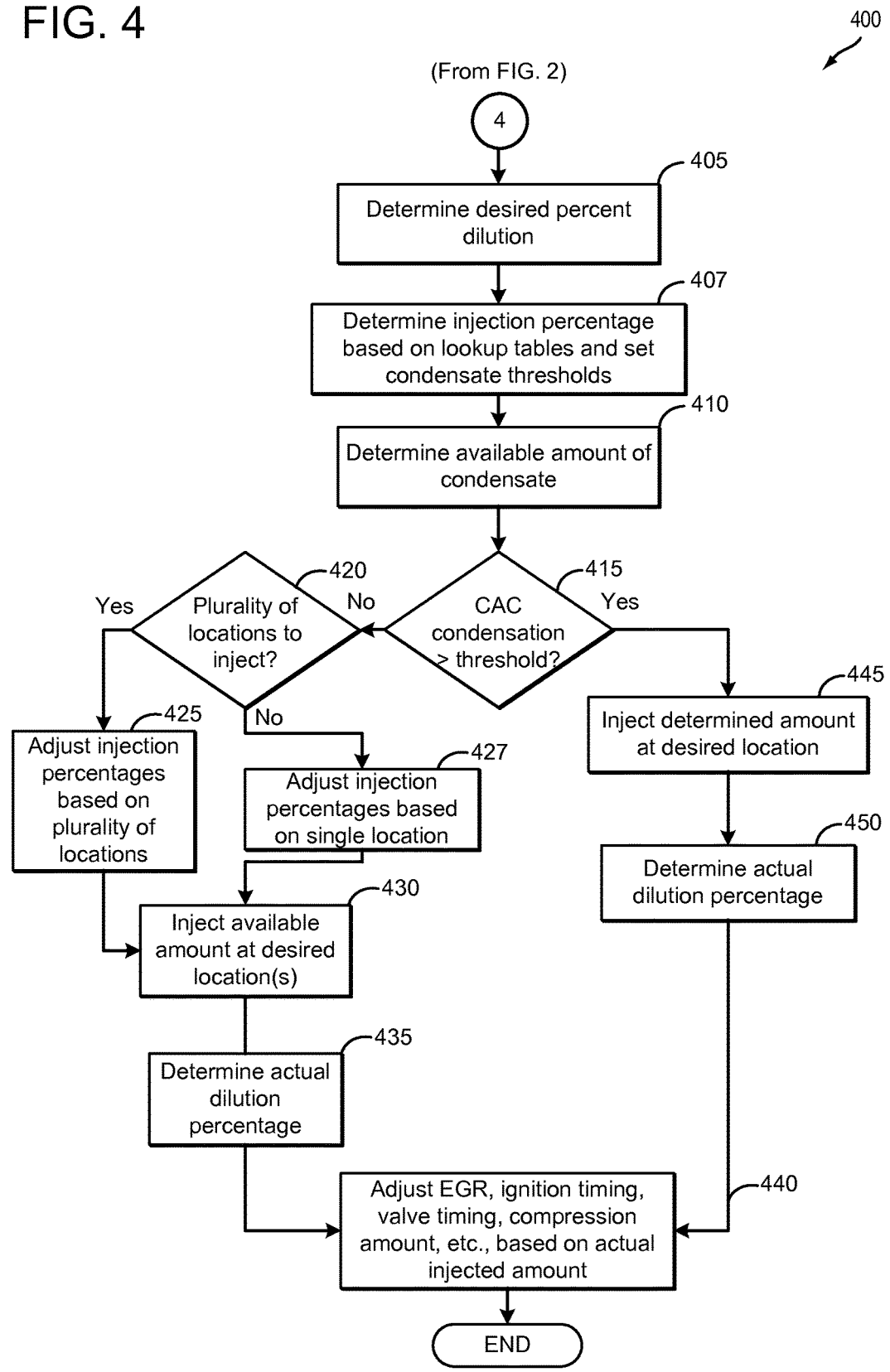
FIG. 4 is a flow chart of a method for obtaining a desired engine dilution based on the availability of condensate collected from the charge air cooler.

Now turning to FIG. 4, a method is shown for injecting condensate collected from a CAC into engine locations including one or more of the intake manifold, upstream of the LP EGR cooler, and/or upstream of the HP EGR cooler, as determined by the method detailed in FIG. 2 and in relation to the engine operating conditions assessed as according to FIG. 3. Instructions for carrying out method 400 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. It should be understood that the method 200 may be applied to other systems of a different configuration without departing from the scope of this disclosure.

At 405, method 400 includes determining a desired percent dilution. A dilution percent may be indicated based on the current engine operating parameters (e.g., engine speed and load), $NO_x$ formation, engine temperature, air/fuel ratio, pre-ignition events, and the presence of engine knock. In one example, a higher percent dilution may be desired as an engine load increases to reduce the likelihood of engine knock, as well as to improve engine NOx emissions, but subject to a combustion stability limit. In some examples, the desired dilution rate may also be determined by an optimal fuel economy for the engine.

At 407, method 400 includes determining an optimal ratio of percent condensate injection at the one or more engine locations indicated as described in relation to the method depicted in FIG. 2, to percent EGR, based on the desired percent dilution indicated at 405. For example, an engine operating in a region characterized by high load and low speed, such as region 302 as described in FIG. 3, may be prone to pre-ignition events and engine knock. Thus, condensate injection directly into the intake manifold may be advantageous due to the significant cooling effect provided as a result of water changing state from liquid to vapor. Thus, in this example, the percentage of condensate injection may be increased, and the percentage of EGR decreased, to meet a desired dilution percentage. In another example, for an engine operating in a region characterized by medium load and medium speed, such as region 310 as described in FIG. 3, it may be beneficial to increase the percentage of EGR and correspondingly reduce the percentage of condensate injection at a predetermined location such that a desired dilution may be met while reducing pumping loss. In yet other examples, indicated by engine operating regions such as 304, 306, 308, for example, optimal percent condensate injection to percent EGR may vary. Thus, at 407, an optimal percent condensate injection to percent EGR may be indicated, for example, via lookup tables residing in the engine control unit, such as controller 12 described in relation to FIG. 1. More specifically, the lookup tables may indicate an optimal percent condensate to percent EGR for a given engine operating condition, based on a desired dilution. Further, the lookup tables may include additional control values to optimally achieve the dilution requirements, such as spark timing adjustments, intake or exhaust valve timing adjustments, and/or amount of compression adjustments. Based on the indicated percent condensate injection at one or more engine locations in relation to one or more of EGR flow, spark timing, intake and/or exhaust valve timing, and compression, a threshold level of condensate required to meet said dilution requirement may be determined.

At 410, an available amount of condensate collected from the CAC is precisely determined. The precise amount of condensate collected from the CAC may be indicated by a fluid level sensor coupled to the reservoir in one example, or may be indicated by monitoring a current draw of the pump utilized for the routing of CAC condensate to a plurality of engine locations, as previously described above in relation to FIG. 2.

Continuing at 415, method 400 includes determining whether the level of CAC condensation measured at 410 is greater than or equal to the threshold values determined at 407 for each of the injection locations. For example, if it is determined that conditions are present for CAC condensate injection into a single location as indicated by the method described in detail in FIG. 2, at 415 it is indicated whether the level of CAC condensation is greater than or equal to the threshold level of condensate deemed required to meet a desired dilution at that particular location. In another example, if it is determined that conditions are present for CAC condensation injection into a plurality of locations as indicated by the method described in detail in FIG. 2, at 415 it is indicated whether the level of CAC condensation is greater than or equal to the sum of threshold levels of condensate deemed required to meet a desired dilution.

If at 415 it is determined that the level of CAC condensate is less than a threshold, method 400 proceeds to 420 where method 400 includes determining whether one or more of a plurality of locations are indicated for injection. If a plurality of locations are indicated, method 400 proceeds to 425 where the injection amounts to each determined location are adjusted based on the previously determined percentages indicated by the lookup tables at 407, in relation to the available amount of condensate, indicated at 410. For example, if injection into both the intake manifold and the LP EGR cooler is indicated, and based on the set thresholds at 407 the ratio of injection is determined to be 2:1 (intake manifold:LP EGR cooler), at 425, method 400 includes adjusting the amount of injection such that the ratio is maintained though the amounts of injection will be less than the threshold amounts determined at 407. Accordingly, one or more of EGR flow, spark timing, intake and/or exhaust valve timing, and/or compression may be correspondingly adjusted such that the desired dilution may be met as a result of a lower injection amount. Returning to 420, if a plurality of injection locations are not indicated, method 400 proceeds to 427, where method 400 includes adjusting the amount of injection for said location based on the available amount of condensation. Again, one or more of EGR flow, spark timing, intake and/or exhaust valve timing, and/or compression may be correspondingly adjusted such that the desired dilution may be met as a result of a lower injection amount. Following the adjustments at 425 and 427, method 400 proceeds to 430 where the available amount of condensate is injected into the indicated location(s) based on the adjusted injection amounts determined at 425 or 427. Injection of the timing and duration of the available amount of condensate may be coordinated by valves, such as valves 191, 192, 193, and injectors, such as injectors 195, 196, 197 indicated in FIG. 1. Additionally, based on the adjusted injection amounts, said flow adjustments (via the EGR valve 142 and/or 155), spark timing adjustments, intake or exhaust valve timing adjustments, amount of compression adjustments, throttle position adjustments, etc., may be concurrently made, in order to achieve the desired dilution percentage.

Following injection of available condensate into one or more indicated locations, at 435 method 400 includes monitoring the actual dilution percentage. As described above, oxygen sensor 162 may be used to infer the total percent dilution of the aircharge due to diluents in the airflow (including EGR and water vapor). Based on the amount injected and dilution percent attained, the controller may then adjust one or more of EGR valve 142, EGR valve 155, spark timing, intake or exhaust valve timing, amount of compression, etc., to achieve/maintain a desired total aircharge dilution percentage of the intake air. As the entire amount of available condensate was allocated for attaining the desired dilution percentage, further requirements to altering the dilution percentage may not be attained by condensate injection, until the condensate levels have had time to build. Thus, further modifications and/or changes in dilution requirements must be met by adjusting one or more of EGR valve 142, EGR valve 155, spark timing, intake or exhaust valve timing, amount of compression, etc., to achieve/maintain a desired total aircharge dilution percentage of the intake air.

Returning to 415, if it is determined that the level of CAC condensation is greater than or equal to the indicated threshold, method 400 proceeds to 445. At 445, method 400 includes injecting the determined amount of condensate at the desired locations, concurrent with adjusting EGR flow based on the percentages obtained from lookup tables at 407 of method 400. Injection of the timing and duration of the available amount of condensate may be coordinated by valves, such as valves 191, 192, 193, and injectors, such as injectors 195, 196, 197 indicated in FIG. 1. Adjustments to EGR flow may be accomplished via adjustments to EGR valves, such as valve 142 and/or 155, indicated in FIG. 1. Additionally, based on the instructions indicated via the lookup table at 407, spark timing adjustments, intake or exhaust valve timing adjustments, amount of compression adjustments, throttle position adjustments, etc., may be concurrently made, in order to achieve the desired dilution percentage.

Following initiation of the injection of the desired amount(s) of condensate into one or more indicated location(s), at 450 method 400 includes monitoring the actual dilution percentage. Again, oxygen sensor 162 may be used to infer the total percent dilution of the aircharge due to diluents in the airflow (including EGR and water vapor). Based on the actual dilution percent attained, at 450, method 400 proceeds to 440 wherein the controller may then adjust one or more of EGR valve 142, EGR valve 155, spark timing, intake or exhaust valve timing, amount of compression, etc., to achieve/maintain a desired total aircharge dilution percentage of the intake air. For example, water injection into the intake manifold may be accompanied by a decrease in total EGR flow, such that the desired dilution is attained primarily by water injection. Further, because the level of CAC condensation was greater than the threshold required to meet anticipated dilution requirements, further modifications to attaining/maintaining the dilution percentage may additionally be met by water injection at the determined location, controlled for example by one or more of valves 191, 192, 193, and injectors, such as injectors 195, 196, 197 indicated in FIG. 1. In other words, as long as CAC condensate is available for maintaining a required dilution percentage, CAC condensate may be preferentially utilized to meet the dilution requirement. In the case wherein a dilution requirement can no longer be met with CAC condensate due to low levels, method 400 includes adjust one or more of EGR valve 142, EGR valve 155, spark timing, intake or exhaust valve timing, amount of compression, etc., to achieve/maintain a desired total aircharge dilution percentage of the intake air.

Figure 5:
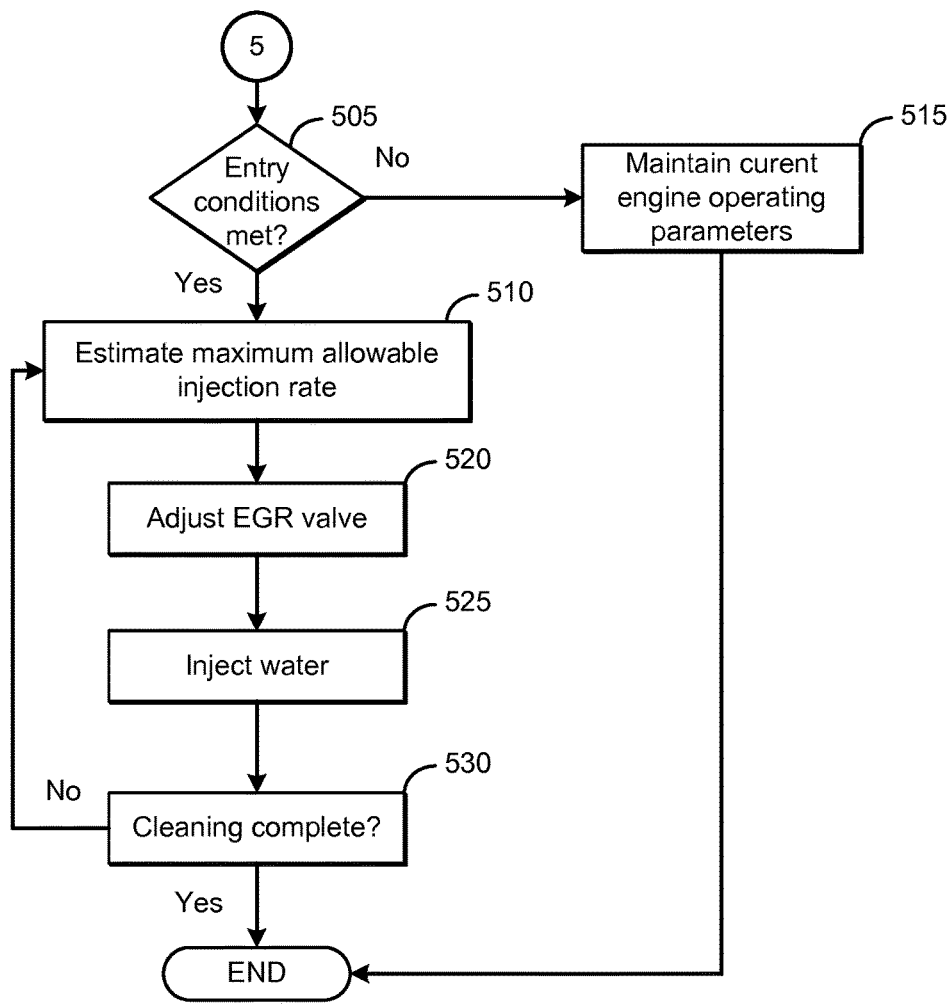
FIG. 5 shows a flow chart illustrating an example method for cleaning an EGR cooler with condensate collected from the charge air cooler.
Figure 6:
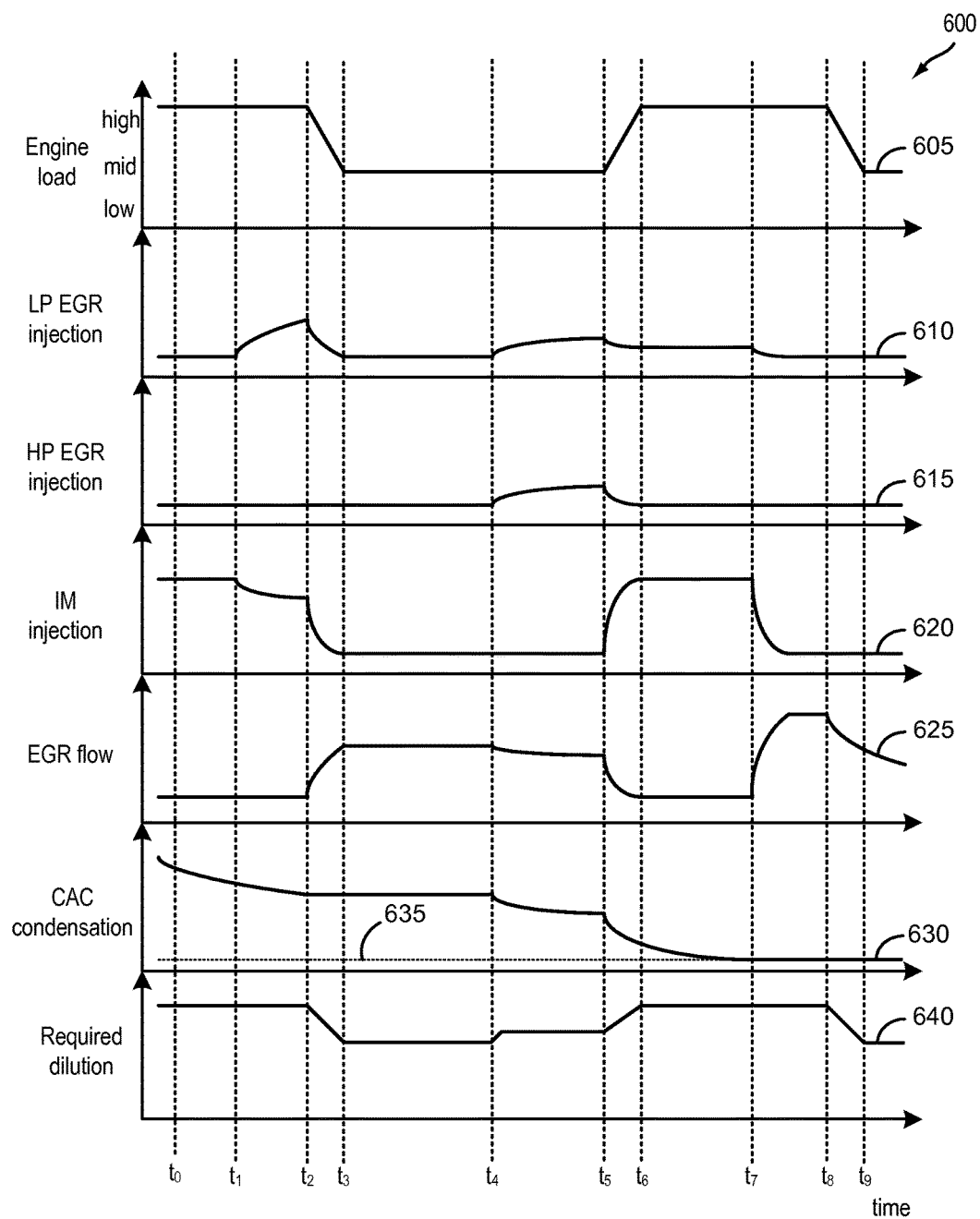
FIG. 6 shows a timeline for meeting engine dilution requirements under varying engine operating conditions based on the availability of condensate collected from the charge air cooler.

FIG. 5 is a flow chart illustrating an example method 500 for injecting water upstream of an LP EGR cooler and/or an HP EGR cooler in order to perform a clean-out cycle for the indicated EGR cooler. More specifically, method 500 includes, upon indication that EGR cooler cleaning is required as detailed in the method described in FIG. 2, determining whether a threshold amount of CAC condensate is available, and if so, performing the cleaning as described according to the detailed instructions of method 500. Instructions for carrying out method 500 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below. It should be understood that the method 500 may be applied to other systems of a different configuration without departing from the scope of this disclosure.

Method 500 begins at 505 where it is determined whether entry conditions are met for performing the indicated EGR cleaning routine. In one example, meeting the entry conditions may include indicating a CAC condensate level above a threshold. As described above, the amount of condensate collected from the CAC may be indicated by a fluid level sensor coupled to the reservoir in one example, or may be indicated by monitoring a current draw of the pump utilized for the routing of CAC condensate to a plurality of engine locations. The threshold may be set based on a predetermined amount of condensate required to perform a cleaning routine, for example an amount of condensate that will enable injection for a predetermined amount of time. In another example, the threshold level may be set a predetermined level higher than an amount estimated to enable successful cleaning routine. In this example, if the cleaning routine were to require more water than the predetermined amount, ample water would remain available to successfully perform the cleaning routine. In yet another example, the threshold may be set based on an indication of the level of cleaning required. The level of cleaning required may be determined by measurement or model, as described above in relation to FIG. 2. For example, a particulate load in an EGR cooler may be determined based on a change in an EGR pressure upstream and downstream of the indicated EGR cooler. The particulate load may be compared to a threshold particulate load, and depending on the degree of difference between the measured particulate load and the threshold load, the CAC condensate threshold level indicated for performing the cleaning routine may be adjusted accordingly. Other entry condition requirements for proceeding with the cleaning routine indicated in method 500 may include an EGR cooler temperature being above a threshold temperature, and/or a compressor speed being below a threshold speed. For instance, if the EGR cooler temperature is below a threshold EGR cooler temperature then the fluid in the direct injection may not fully vaporize. Incomplete vaporization leads to poor mixing along with water deposits in the EGR cooler. If the compressor speed is above the threshold compressor speed, then dislodged particulate matter from the direct injection in the EGR cooler may be carried to and damage the turbocharger. If, at 505, entry conditions are not met, method 500 proceeds to 515. At 515 method 500 includes maintaining current engine operating parameters. Maintaining engine operating parameters at 515 may include maintaining CAC routing valves, such as valves 191, 192, 193, and injectors, such as injectors 195, 196, 197, in their current state. As another example, at 515, method 500 may further include maintaining HP EGR valve, such as valve 142, and low pressure EGR valve, such as valve 155, in their current state. Additionally at 515, maintaining current engine operating parameters may include setting a flag at the controller indicating a requirement for a future EGR cleaning routine. Initiation of the cleaning routine may be based on an indication that the CAC condensation level has reached a threshold level, the threshold level being a level necessary to perform the cleaning routine, for example. Method 500 may then end.

If, at 505, it is determined that entry conditions are met for performing an EGR cleaning routing, method 500 proceeds to 510. At 510, method 500 includes estimating a maximum injection rate. Factors that may affect the maximum injection rate include, but are not limited to condensate levels in one or more segments of an induction system and/or an engine combustion stability threshold. The injection rate may be defined by a mass over time (e.g., 5 kg/hr). The induction system may include a compressor, charger air cooler, and intake manifold, as well as the intake passage fluidically coupling the compressor, charge air cooler, and intake manifold. Condensate levels within the induction system may be calculated by measuring a dew point temperature at a suitable location in the induction system. As an example, in a low pressure EGR (LPEGR) system, the condensate levels in the intake passage pre-compressor, intake passage post-charge air cooler, and intake manifold may affect the maximum water injection rate. As another example, for a high pressure EGR (HPEGR) or naturally aspirated EGR (NAEGR) system, condensate levels in the intake manifold may affect the maximum water injection rate.

The engine combustion stability threshold may include a maximum engine dilution tolerance above which combustion stability issues may occur (e.g., misfire, etc.). A total dilution provided to the engine may be controlled to be less than the engine dilution tolerance maximum, in order to avoid combustion stability issues. The total dilution is equal to a sum of the EGR flow rate and the amount of fluid injected. The amount of fluid injected is adjusted according to the EGR flow rate and the engine combustion stability threshold, so that a total dilution may be less than the engine dilution tolerance maximum.

At 520, the method includes adjusting the EGR flow rate responsive to the direct injection rate. The EGR flow rate may decrease as the direct injection rate increases. The adjusting may further include reducing the EGR flow rate to a minimum flow rate as the direct injection rate is increased to a maximum rate. In one example, the minimum EGR flow rate may be a predetermined minimum flow rate that is able to carry fluid from the EGR cooler into the engine. In another example, the minimum EGR flow rate may be the minimum required to keep a desired temperature in the EGR cooler.

At 525, the method includes the direct injection of water upstream of the indicated EGR cooler. As described above, the injection rate may be based on the EGR flow rate and condensate levels in the induction system. At 530, the controller determines if cleaning is complete. A clean EGR cooler may be estimated by injecting a predetermined amount of fluid (e.g., 100 mL) or by injecting the fluid for a predetermined amount of time (e.g., 30 seconds). A clean EGR cooler may also be estimated by measuring the exhaust pressure upstream and downstream of the EGR cooler. If the pressures are substantially equal or within a desired pressure drop, then the EGR cooler may be determined to be clean. If the EGR cooler is not clean, then the method returns to 510. If the EGR cooler is clean, the method may exit.

FIG. 6 shows an example timeline 600 for injecting stored CAC condensate into various engine paths including the intake manifold, upstream of the LP EGR cooler, and/or upstream of the HP EGR cooler according to engine operating conditions. Timeline 600 includes plot 605, indicating an engine load, over time. Timeline 600 further includes plot 610, indicating an injection rate upstream of an LP EGR cooler, and plot 615, indicating an injection rate upstream of an HP EGR cooler, over time. Timeline 600 further includes plot 620, indicating the injection rate directly into an intake manifold, over time. Timeline 600 further includes plot 625, indicating a total EGR flow based on the sum of HP and LP EGR flow, over time. Timeline 600 further includes plot 630, indicating the level of stored CAC condensate, over time. Line 635 represents a threshold level of stored CAC condensate, below which injection into any of the indicated paths is not enabled. Timeline 600 further includes plot 640, indicating a required dilution based on engine operating conditions to keep NOx in combustion gases below desired amounts and avoid ignition knock, over time.

At time $t_0$ the engine is operating at a high load, indicated by plot 605. Based on engine operating conditions, such as that indicated by the map depicted in FIG. 3, a required dilution is indicated, as shown by plot 640. Accordingly, a determined ratio of percent condensate injection in one or more of a plurality of engine locations to percent EGR flow has been defined by a lookup table, such as lookup table described in relation to the method depicted in FIG. 4. At time $t_0$ engine operating conditions are such that to optimally meet dilution requirements, percent condensate injection into the intake manifold is high, indicated by plot 620, while EGR flow, indicated by plot 625, is low. Between time $t_0$ and $t_1$, as condensate is injected into the intake manifold, the stored level of CAC condensation, indicated by plot 630, decreases. At time $t_1$, engine load remains high and the required dilution remains essentially unchanged, yet operating conditions have changed slightly such that according to the lookup table, optimally meeting dilution requirements includes increasing condensate injection upstream of the LP EGR cooler, indicated by plot 610, and decreasing condensate injection directly to the intake manifold. For example, the change in dilution requirement may be related to combustion stability or the need to clean the LP EGR cooler. Thus, between time $t_1$ and $t_2$, dilution requirements are met by a combination of injection into the intake manifold, injection upstream of the LP EGR cooler, and a low EGR flow. Accordingly, CAC condensation levels continue to drop.

Between time $t_2$ and $t_3$, the engine transitions from high load to a mid-load operating condition. As such, the required dilution decreases. According to a lookup table, dilution conditions may be optimally met by increasing the percent of EGR flow, and decreasing the percent condensate injection at one or more engine locations. Accordingly, between time $t_2$ and $t_3$, EGR flow is increased, and injection upstream of the LP EGR cooler, and into the intake manifold, are correspondingly decreased. As condensate is no longer being utilized, the level of stored condensate is stabilizes.

Between time $t_3$ and $t_4$, dilution requirements are optimally met by a level of EGR flow determined by lookup tables based on engine operating conditions. As such, the level of condensate remains essentially unchanged.

At time $t_4$, the engine continues to operate at mid-load, yet a slight increase in the dilution is required. This may be due to, as one example, slightly elevated combustion temperatures and thus a requirement for reducing NOx. As such, optimally meeting the dilution requirement as determined by lookup tables based on the engine operating conditions includes increasing condensate injection both upstream of the LP EGR cooler and upstream of the HP EGR cooler, while correspondingly slightly decreasing EGR flow. Accordingly, between time $t_4$ and $t_5$, the level of condensate declines.

Between time $t_5$ and $t_6$, the engine transitions to a high load. As such, dilution requirements increase. Operating conditions are such that to optimally meet dilution requirements, increased injection into the intake manifold, a concurrent decrease in EGR flow, and a decrease in injection upstream of the LP EGR cooler, is indicated according to lookup tables. As such, stored condensation levels continue to decline.

Between time $t_6$ and $t_7$, injection into the intake manifold continues to be utilized to meet the dilution requirement at a high load, and thus condensation levels continue to decline, until at time $t_7$, condensation levels reach a threshold level, indicated by line 635. Thus, at time $t_7$ the level of CAC condensation is very low, and engine dilution requirements cannot be met by condensate injection. As such, injection of condensation injection is disabled. Accordingly, dilution requirements are met by compensating for the lack of condensate injection by increasing the overall flow of EGR. Thus, between time $t_7$ and $t_8$ EGR flow is increased to compensate for the decline in condensate injection into the intake manifold and upstream of the LP EGR cooler. As such, between time $t_8$ and $t_9$, engine dilution requirements are met by transitioning from a situation where condensate may be used to meet requirements, to a situation where the engine dilution requirements are met solely by EGR.

At time $t_8$, engine load begins to decline. Between time $t_8$ and $t_9$, as engine load is declining, the required dilution also declines. Accordingly, the flow of EGR is reduced. Stored condensate from the CAC has not yet had time to build to appreciable levels, thus any dilution requirements must be met by EGR.

In this way, condensate collected from a CAC may be routed to a plurality of engine locations as a function of engine operating conditions. As such, CAC condensate, typically a nuisance due to the potential for the condensate freezing, decreasing CAC effectiveness, and for causing engine misfire and/or combustion instability as a result of water ingestion into the intake manifold, may be advantageously utilized to improve engine efficiency. For example, injection of CAC condensate into one or more of a plurality of engine locations may help meet engine dilution requirements under varying engine operating conditions, thereby decreasing engine knock and reducing NOx levels.

The technical effect of collecting CAC condensate in a reservoir and routing the condensate to a plurality of engine locations using the methods described herein is to enable precise control over engine dilution requirements under varying engine operating conditions by utilizing a renewable onboard water source. As the reservoir need not be maintained by a vehicle operator, it is more likely that condensate will be present under conditions wherein the injection of water into one or more engine locations would be advantageous. In this way, engine efficiency may be improved and harmful emissions may be reduced.

The systems described herein and with reference to FIG. 1, along with the methods described herein and with reference to FIGS. 2, 4, 5 may enable one or more systems and one or more methods. In one example a method comprises collecting condensate from cooling air routed into an engine, routing said condensate into the engine via one of a plurality of locations based on operating conditions of said engine, determining a desired percentage of dilution for combustion in said engine based on said operating conditions, and adjusting said condensate injection and adjusting recirculation of exhaust gases from said engine to form said desired dilution based in part on said injection location. In a first example of the method, the method includes wherein said routing said condensate into the engine via one of a plurality of locations based on operating conditions comprises injecting into an air intake manifold of said engine; injecting into a first exhaust gas heat exchanger which cools exhaust gases before introduction of said exhaust gases into said intake manifold, or, injecting into a second exhaust gas heat exchanger which cools exhaust gases before introduction of said exhaust gases into an air compressor which supplies compressed air to said intake manifold. A second example of the method optionally includes the first example and further includes wherein said air routed to said engine is first routed from an air compressor and into a charge air cooler. A third example of the method optionally includes one or more of the first and second examples and further includes wherein said exhaust gases entering said first exhaust gas heat exchanger are routed from said engine to said first exhaust gas heat exchanger, the exhaust gases being extracted from the main exhaust flow before flowing over a turbine of a turbocharger which drives said air compressor. A fourth example of the method optionally includes any one or more of each of the first through third examples and further includes wherein said exhaust gases entering said second exhaust gas heat exchanger are routed from said engine across said turbine into said second exhaust gas heat exchanger and then into said air compressor. A fifth example of the method optionally includes any one or more of each of the first through fourth examples and further includes, adjusting one or more of the following to achieve said desired dilution: ignition timing, timing of intake or exhaust valves in said engine, or, amount of compression provided by an air compressor supplying said air routed to said engine.

Another example method comprises collecting condensate from cooling air routed into an engine, routing said condensate into the engine via one of a plurality of locations based on operating conditions of said engine, routing exhaust gases from said engine into an air intake of said engine via one or more of a plurality of locations based on said operating conditions, determining a desired percentage of dilution for combustion in said engine based on said operating conditions to keep NOX in combustion gases below desired amounts and avoid ignition knock in said engine, and, based upon said location selected for routing said condensate and for routing said exhaust gases, injecting an amount of said condensate and adjusting recirculation of exhaust gases from said engine to form said desired dilution based in part on said injection location, and readjusting said injected amount of said condensate and readjusting said recirculation of exhaust gases as availability of said condensate varies. In a first example of the method, the method includes wherein said operating conditions include load and speed of said engine. A second example of the method optionally includes the first example and further includes adjusting ignition timing of said engine to achieve said desired dilution. A third example of the method optionally includes one or more of the first and second examples and further includes adjusting valve timing of said engine to achieve said desired dilution. A fourth example of the method optionally includes one or more of the first through third examples and further includes wherein said cooling air routed into said engine comprises routing said air into a charge air cooler and said collecting said condensed comprises collecting said condensate in a reservoir. A fifth example of the method optionally includes one or more of the first through fourth examples and further includes detecting an amount of said condensate in said reservoir by one or more of a fluid level sensor coupled to said reservoir, or monitoring a current draw of a pump used to help said routing of said condensate and said injection of said condensate. A sixth example of the method optionally includes one or more of the first through fifth examples and further includes adjusting one or more of the following in response to a determination of low levels of condensate in said reservoir to avoid ignition knock in said engine or undesired temperature of said engine; adjusting ignition timing of said engine, adjusting valve timing of said engine, or, adjusting compression of said air routed to said engine. A seventh example of the method optionally includes one or more of the first through sixth examples and further includes wherein said injection of condensate is preferred over adjusting said exhaust gases to achieve said desired dilution.

Another example method comprises supplying compressed air from an air compressor to an air charge cooler and then to an intake manifold of an engine, driving said compressor by a turbine driven by exhaust gases from said engine, collecting condensate formed in said charge air cooler in a reservoir, routing said exhaust gasses to said intake manifold from one or more of the following paths depending on engine operating conditions: from a first cooler which receives said exhaust gases from a position upstream of said turbine; or, from a second cooler which receives exhaust gases from a position downstream of said turbine, enabling injection of said condensate from said reservoir directly into said intake manifold and into said second cooler when said engine begins operation at high loads and disabling said injection directly into said manifold after a predetermined time, enabling injection of said condensate from said reservoir directly into said intake manifold and into said second cooler when said engine operates at very high engine loads, enabling injection of said condensate from said reservoir into said first cooler and said second cooler when said engine operates at medium loads, determining a desired percentage of dilution for combustion in said engine based on said operating conditions including engine load and speed, and adjusting an amount of said enabled condensate injection and an amount of said routed exhaust gases depending on said engine operating conditions to achieve said desired percentage of dilution and further adjusting said amount of routed exhaust gases as said enabled condensate becomes depleted to maintain said desired percentage of dilution. In a first example of the method, the method includes wherein said adjusting of said condensate injection and said adjusting of said amount of said exhaust gases is further based on where said condensate injection is enabled and where said exhaust gases are routed. A second example of the method optionally includes the first example and further includes wherein said routing of said exhaust gases to said first cooler or said second cooler is based in part on detecting fouling within said first or second coolers respectively. A third example of the method optionally includes one or more of the first and second examples and further includes wherein said fouling detection is based on pressure drop of said exhaust gases through said first or second coolers. A fourth example of the method optionally includes one or more of the first through third examples and further includes wherein said operating conditions include load and speed of said engine. A fifth example of the method optionally includes one or more of the first through fourth examples and further includes adjusting one or more of the following to achieve said desired dilution: ignition timing of said engine or valve timing of said engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
    collecting condensate from cooling air routed into an engine;
    routing said condensate into the engine via one of a plurality of locations based on operating conditions of said engine;
    determining a desired percentage of dilution for combustion in said engine based on said operating conditions; and
    adjusting a condensate injection and adjusting recirculation of exhaust gases from said engine to form said desired dilution based in part on an injection location.

2. The method recited in claim 1, wherein said routing said condensate into the engine via one of a plurality of locations based on operating conditions comprises: injecting into an air intake manifold of said engine; injecting into a first exhaust gas heat exchanger which cools exhaust gases before introduction of said exhaust gases into said intake manifold; or, injecting into a second exhaust gas heat exchanger which cools exhaust gases before introduction of said exhaust gases into an air compressor which supplies compressed air to said intake manifold.

3. The method recited in claim 2, wherein said air routed to said engine is first routed from the air compressor and into a charge air cooler.

4. The method recited in claim 3, wherein said exhaust gases entering said first exhaust gas heat exchanger are routed from said engine to said first exhaust gas heat exchanger, the exhaust gases being extracted from a main exhaust flow before flowing over a turbine of a turbocharger which drives said air compressor.

5. The method recited in claim 3, wherein said exhaust gases entering said second exhaust gas heat exchanger are routed from said engine after a turbine into said second exhaust gas heat exchanger and then into said air compressor.

6. The method recited in claim 1, further comprising adjusting one or more of the following to achieve said desired dilution: ignition timing; timing of intake or exhaust valves in said engine; or, amount of compression provided by an air compressor supplying said air routed to said engine.

7. A method comprising:
    collecting condensate from cooling air routed into an engine;
    routing said condensate into the engine via one of a plurality of locations based on operating conditions of said engine;
    routing exhaust gases from said engine into an air intake of said engine via one or more of a plurality of locations based on said operating conditions;
    determining a desired percentage of dilution for combustion in said engine based on said operating conditions to keep NOX in combustion gases below desired amounts and avoid ignition knock in said engine;
    based upon said location selected for routing said condensate and for routing said exhaust gases, injecting an amount of said condensate and adjusting recirculation of exhaust gases from said engine to form said desired dilution based in part on an injection location; and
    readjusting said injected amount of said condensate and readjusting said recirculation of exhaust gases as availability of said condensate varies.

8. The method recited in claim 7, wherein said operating conditions include load and speed of said engine.

9. The method recited in claim 7, further comprising adjusting ignition timing of said engine to achieve said desired dilution.

10. The method recited in claim 7, further comprising adjusting valve timing of said engine to achieve said desired dilution.

11. The method recited in claim 7, wherein said cooling air routed into said engine comprises routing said air into a charge air cooler and said collecting said condensate comprises collecting said condensate in a reservoir.

12. The method recited in claim 11, further comprising detecting an amount of said condensate in said reservoir by one or more of the following: a fluid level sensor coupled to said reservoir; or monitoring a current draw of a pump used to help said routing of said condensate and said injection of said condensate.

13. The method recited in claim 12, further comprising adjusting one or more of the following in response to a determination of low levels of condensate in said reservoir to avoid ignition knock in said engine or undesired temperature of said engine: adjusting ignition timing of said engine; adjusting valve timing of said engine; or, adjusting compression of said air routed to said engine.

14. The method recited in claim 7, wherein said injection of condensate is preferred over adjusting said exhaust gases to achieve said desired dilution.

15. A method comprising:
    supplying compressed air from an air compressor to a charge air cooler and then to an intake manifold of an engine;
    driving said compressor by a turbine driven by exhaust gases from said engine;
    collecting condensate formed in said charge air cooler in a reservoir;
    routing said exhaust gases to said intake manifold from one or more of the following paths depending on engine operating conditions: from a first cooler which receives said exhaust gases from a position upstream of said turbine; or, from a second cooler which receives exhaust gases from a position downstream of said turbine;

enabling injection of said condensate from said reservoir directly into said intake manifold and into said second cooler when said engine begins operation at high loads and disabling said injection directly into said manifold after a predetermined time;

enabling injection of said condensate from said reservoir directly into said intake manifold and into said second cooler when said engine operates at very high engine loads;

enabling injection of said condensate from said reservoir into said first cooler and said second cooler when said engine operates at medium loads;

determining a desired percentage of dilution for combustion in said engine based on said operating conditions including engine load and speed; and adjusting an amount of said enabled condensate injection and an amount of said routed exhaust gases depending on said engine operating conditions to achieve said desired percentage of dilution and further adjusting said amount of routed exhaust gases as said enabled condensate becomes depleted to maintain said desired percentage of dilution.

16. The method recited in claim 15, wherein said adjusting of said condensate injection and said adjusting of said amount of said exhaust gases is further based on where said condensate injection is enabled and where said exhaust gases are routed.

17. The method recited in claim 15, wherein said routing of said exhaust gases to said first cooler or said second cooler is based in part on detecting fouling within said first or second coolers respectively.

18. The method recited in claim 17, wherein said fouling detection is based on a pressure drop of said exhaust gases through said first or second coolers.

19. The method recited in claim 15, wherein said operating conditions include load and speed of said engine.

20. The method recited in claim 15, further comprising adjusting one or more of the following to achieve said desired dilution:ignition timing of said engine or valve timing of said engine.

* * * * *